(12) United States Patent
Beech

(10) Patent No.: US 6,951,214 B2
(45) Date of Patent: Oct. 4, 2005

(54) OVEN TOP SECTION AND METHOD OF CONSTRUCTION

(75) Inventor: Robert Bradley Beech, Yeronga (AU)

(73) Assignee: J. W. Beech Pty Ltd, Queensland (AU)

( * ) Notice: Subject to any disclaimer, the term of this patent is extended or adjusted under 35 U.S.C. 154(b) by 251 days.

(21) Appl. No.: 10/361,523

(22) Filed: Feb. 7, 2003

(65) Prior Publication Data

US 2004/0154611 A1 Aug. 12, 2004

(51) Int. Cl.⁷ .............................. F24C 15/34; A21B 1/00
(52) U.S. Cl. ...................... 126/273.5; 126/1 F; 126/8; 126/144
(58) Field of Search ........................ 126/273 R, 273.5, 126/19 R, 8, 1 F, 190, 144, 148, 400, 39 B, 39 C; 99/447, 401

(56) References Cited

U.S. PATENT DOCUMENTS

| | | | | |
|---|---|---|---|---|
| 125,439 | A | * 4/1872 | Chatain | 126/9 R |
| 2,870,624 | A | * 1/1959 | Sampson | 126/8 |
| 3,756,140 | A | * 9/1973 | Kolivas | 126/8 |
| 4,108,138 | A | 8/1978 | Petin et al. | |
| 4,474,165 | A | 10/1984 | Richardson | |
| 4,714,072 | A | * 12/1987 | Fidler et al. | 126/1 F |
| 4,920,899 | A | * 5/1990 | Blundy et al. | 110/336 |
| 5,413,033 | A | 5/1995 | Riccio | |
| 6,041,769 | A | * 3/2000 | Llodra et al. | 126/273 R |

FOREIGN PATENT DOCUMENTS

| | | |
|---|---|---|
| EP | 0 409 758 | 1/1991 |
| EP | 695923 A1 * | 2/1996 |
| JP | 2004-114708 A * | 4/2004 |

OTHER PUBLICATIONS

Brochure: "Beech Wood Fired Ovens—A New Approach to Traditional Cooking".
Brochure: "Beech Wood Fired Ovens—A New Approach to Traditional Cooking", May 2000.
Brochure: "Beech Ovens".
Brochure: "Beech Wood Fired Ovens", May 2001.

* cited by examiner

Primary Examiner—Josiah C. Cocks
(74) Attorney, Agent, or Firm—Knobbe, Martens, Olson & Bear, LLP

(57) ABSTRACT

A top section for an oven formed with an outer support shell, an intermediate insulating layer and an inner refractory lining wherein the three layers are connected by a plurality of spaced members. The spaced members are preferably formed as stainless steel pegs welded to an inner surface of the outer support shell extending across the intermediate insulating layer and fixed to the inner refractory lining as a result of the cast refractory lining setting around the pegs. The pegs may be covered at least in part by a plastic tip or coating to provide a relative expansion capacity between the pegs and the refractory lining. The outer section is preferably formed from steel, may be any suitable shape and includes one or more apertures to form doorways, flues and access ports for accessory items such as char-grilles, lights, fire retardant systems and windows. The invention extends to an oven including a top section as disclosed. The invention also extends to a method of forming an oven comprising the steps of forming the outer housing, welding pegs to an inner surface of the outer housing, locating insulating material inside the outer housing, positioning a mold defining a cavity of the top section and pouring and setting a castable refractory lining of the oven. The method may further include the step of positioning plastic tips over the pegs.

33 Claims, 3 Drawing Sheets

OVEN TOP SECTION AND METHOD OF CONSTRUCTION

FIELD OF THE INVENTION

This invention relates to ovens particularly wood fired ovens but also including ovens heated by alternative means such as gas. The invention in particular relates to an oven top section which is especially suitable for preparation of food and a method of its construction.

BACKGROUND OF THE INVENTION

Ovens for cooking food and wood fired ovens in particular are ancient in origin. Although high technology gas and electric ovens are now available, many people regard wood fired ovens as capable of providing preferred flavours to foods. There has therefore always been a demand for wood fired ovens. Relatively recently this demand has undergone something of resurgence for preparation of food, particularly foods such as pizzas, tandoori style meals and roasts. Typically, a modern wood fired cooking oven will be formed with a flat base of refractory material and a dome of refractory material forming an enclosure in which a solid fuel may be burnt while resting directly on the base. The burning fuel shares the floor space with food to be cooked. Various portholes may be provided to facilitate access for food and fuel as well as for the discharge of hot gases. The latter are often channelled through flues. The dome is usually formed by casting a hemisphere of refractory material which may be cast in situ or alternatively cast such as in a factory elsewhere and transported to the final assembly point.

As noted, the material used in formation of the ovens is described as "refractory" which includes the notion of a material having the ability to retain its physical shape and chemical identity when subject to high temperature. Typically, the refractory material is formed as bricks of various shapes and sizes used for lining a furnace or oven.

Once the oven inner structure is formed, a surround is subsequently built around the oven to enhance insulation and minimise the chance of damage to surrounding structures and people operating the oven.

A limitation of this approach is that the dome must be self-supporting. As a result, the size and shape of the dome is somewhat limited. Further, the refractory material is relatively brittle which presents a problem when attempting to mould the dome in one piece at a ceramic factory and transport it undamaged to the oven site without cracking.

The need for strength also favours the production of predominantly hemispherical domes which result in a central high point of the oven. The roof of the oven contributes to the cooking process as it acts as both a restraint on heat loss and a reflector or radiator of incident heat on to material to be cooked. Efficiency of the oven is enhanced if the roof is kept as close as possible to the food to be cooked, thereby maximising both concentration and reflection of the heat. While it is possible to vary the shape of the dome by having a lowered central region, this approach leads to weaknesses which may result in substantial reduction of oven working life and even catastrophic failure.

A further problem inherent with the prior art ovens is the limitation on the number of portholes that may be included for accessory features. Each aperture in the dome creates a weak point. It is generally preferred to minimise the number of such apertures to an access port for loading fuel and food which may also serve as an exit port for hot gases. Various other apertures may be of considerable use such as those provided for lighting, viewing windows, char-grilles, fire retardant systems, extra doors and gas fire systems. These additional useful access ports are therefore traditionally avoided if possible.

Various responses to the challenge of forming an oven dome have been documented. U.S. Pat. No. 4,108,138 to Petin and Richardson discloses a method of forming a dome by casting hemispherical sectors of refractory material and assembling the sectors into a dome while supported by a base. The sectors are formed with interlocking edges to help hold them together and the entire dome is enclosed within an insulated chamber. While this innovative approach overcomes some of the problems of providing an oven dome, it still encounters the problem of relatively weak structural integrity thereby minimising the ability to provide extra or multiple apertures in the oven. Further it has been found that expansion and contraction during heating cycles leads to wear in the interlocking edges with resultant weak points in the oven walls.

U.S. Pat. No. 4,474,165 to Richardson describes an improved cooking oven which has two flat surfaces covered by an enclosure. Three openings are provided in the wall of the enclosure, two of which are used for passage of food and fuel while the third serves as a flue. This oven is built in a similar fashion to that described in U.S. Pat. No. 4,108,138 referred to above. Surrounding the dome is an outer wall of brick or other suitable structural material. Insulating material is placed in the space between the outer surface of the dome and the inner surfaces of the wall and the cover. The insulating material may include a ceramic fibre blanket directly over the dome. Further insulating material is provided in the form of vermiculite for example, to fill the space between the blanket and the wall beneath the cover. The sectors are formed from a refractory known as "Moldit D"™ with metal fibres dispersed therein. The sectors are moulded separately and then brought in finished form to the oven construction site to be assembled. Thus, the more difficult task of moulding the dome in one piece and then transporting it to the oven site without cracking it is avoided. This invention is a variation on that referred to in the earlier US patent and one inventor is common to both. It suffers from the same problems described above.

U.S. Pat. No. 5,413,033 to Riccio discloses an oven with a stone covered bottom. The stone covered bottom includes a baking area in which the food product is baked. The top of the oven is connected to the bottom and constructed to form a domed chamber over the baking area. The top is constructed from a plurality of pieces that are shaped to provide a conventional dome configuration. Each piece is constructed to permit expansion and contraction of the pieces caused by heat changes while preventing a piece from falling onto the bottom. It has been found that each piece is best formed with a tongue and groove configuration. This joint however, is prone to wear with resulting risk of shortening the working life. The issues of brittleness and risk in transport also arise.

European Patent No. 0409758 to Georges and Tisserant describes a wood burning oven with a high throughput rate. The oven is constituted by a roof made of refractory materials of annular shape, concave in its centre and with a rotating floor. The oven is particularly suitable for rapid cooking dishes such as pizzas.

The prior art does not described a method of producing a top section for an oven which may be formed in a factory and transported safely and relatively easily to the assembly point and wherein the top section also has considerable structural strength.

SUMMARY OF THE INVENTION

Throughout this specification, unless the context requires otherwise, the word comprise, or variations such as comprises or comprising, will be understood to imply the inclusion of a stated element or integer or group of elements or integers but not the exclusion of any other element or integer or group of elements or integers.

In a first broad aspect, the invention resides in a top section for an oven, the top section comprising an outer support shell, an inner refractory lining, an insulating layer intermediate the outer support shell and inner refractory lining and connection means for connecting the outer support shell, inner refractory lining and intermediate insulating layer together.

The outer support shell is preferably metallic. Most preferably the outer support shell is formed from steel, preferably mild steel around 5 or 6 mm thick. The outer support shell may be any suitable shape. It may be formed as a curved structure such as a cylinder or a hemisphere. Alternatively or additionally, it may be formed with a box like configuration.

The inner refractory lining may be formed from any suitable material. Preferably the inner lining is cast using a refractory castable material. The castable material may be "Thermal Ceramics-Moral 125". The inner refractory lining is preferably a ceramic material.

The intermediate insulating layer may be formed from any suitable material. Preferably the material is formed from fibrous material and as a blanket. One preferred material is a product known as "Thermal Ceramics-Kao Wool 25 mm, 128 density".

The connection means is preferably a plurality of spaced members fixed to the outer support shell, extending across the intermediate insulating layer and fixed to the inner refractory lining. The members may be pins. The pins may be formed as stainless steel pegs at least some of which may have an angled portion for better retaining the inner lining. The pins may be welded to the outer support shell or otherwise fixed in any suitable fashion. The pins may be fixed to the inner refractory lining by casting the lining and allowing it to set around a distal region of each pin.

The pins may include a coating or cover applied to at least part of the outer surface of the pin and is preferably positioned distally on the pins. The coating or cover is adapted to provide an expansion space between a pin and the refractory lining to permit expansion of the pin relative to the refractory lining during use. The coating or cover is preferably formed from a plastic material which may be a thermoplastic material.

In a further aspect, the invention comprises an oven including a base and an oven dome as described above. The base may comprise a metal support layer and refractory layer. The refractory layer may be formed of bricks.

In yet a further aspect, the invention resides in a method of forming an oven top section, the method comprising the steps of:

forming an outer support shell;
fixing a plurality of inwardly directed pegs to the outer support shell;
locating an insulating material inside the outer support shell;
positioning a mould, the mould defining the shape of a cavity of the oven; and
casting a refractory material to form an inner lining of the oven top section, the refractory material positioned to set around a distal portion the pegs.

The outer support shell may include apertures for fixtures such as doors, lights char-grilles windows and similar.

The mould for the cavity may provide apertures which correspond to the apertures of the outer shell. The method may further include the step of fixing the pegs to the outer shell by welding.

Locating plastic tips on distal regions of the pegs may be included in the method. The cast refractory material may be allowed to set. The method may include forming a base and fixing the top section to the base.

BRIEF DESCRIPTION OF THE DRAWINGS

FIG. 1A is a magnified view of a portion of the oven of the present invention.

DETAILED DESCRIPTION OF THE DRAWINGS

Figure 1:
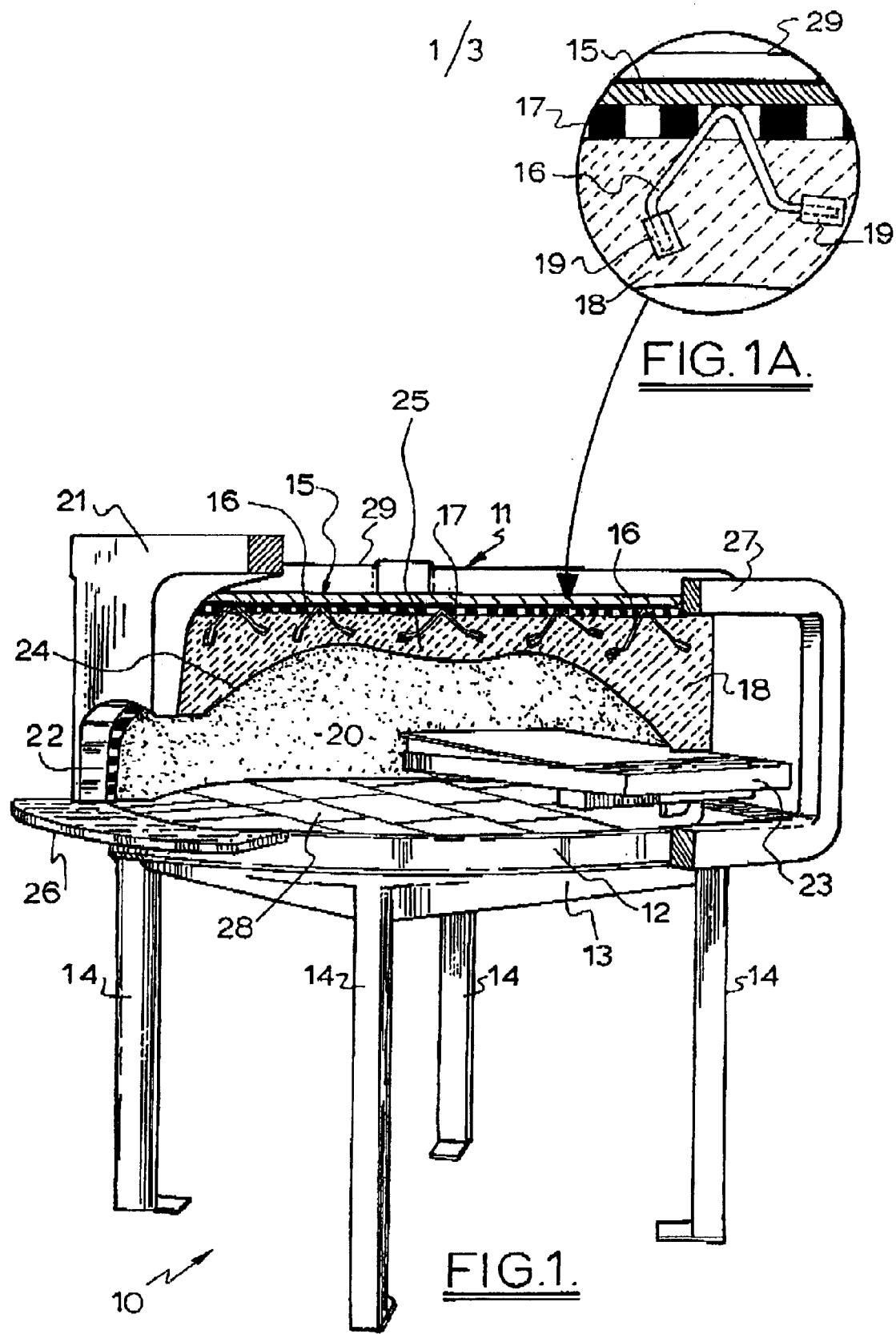
FIG. 1 is a part sectional isometric view of an oven of the present invention.

Referring to FIG. 1 there is seen an oven designated generally as 10 formed according to the present invention and shown in part sectional isometric view. The oven has a top section 11 which rests on or is attached to a base 12 which in turn is supported by a support frame 13. The support frame 13 includes legs 14 which may be formed from any suitable material such as stainless steel.

The top section 11 comprises an outer casing 15 which may be formed to any suitable shape. The outer casing 15 may be substantially cylindrical as shown. One of the advantages of the present invention is that a wide range of external shapes can be used. The outer casing 15 is preferably formed from steel and may be 5 to 6 millimetres thick depending on the size of the oven.

The outer casing 15 has a series of pegs 16 welded to its inside surface forming connection means. The pegs may be formed in any suitable shape and size. The applicants have found a distorted V shape to be particularly effective with terminal portions of the pegs bent or cranked for better gripping of castable refractory material which is subsequently applied.

FIG. 1A is a magnified view of such an arrangement wherein the peg 16 is welded to the outer casing 15 and penetrates the insulating material 17 before extending into refractory cast material 18.

The peg 16 has plastic tips 19 applied to its outer ends. The plastic tips allow for expansion of the peg relative to the refractory material during heating and thereby avoiding damage to the refractory layer 18. The peg 16 may be suitably formed from stainless steel.

Although the shape and nature of the peg has been described specifically, it is cleared to a skilled addressee that other materials and means for attaching the peg or creating a bridge to bind the outer casing 15 refractory material 18 and insulating material 17 together may be used. For example, a peg or peg-like structure may be riveted through an aperture in the outer casing. The structure of the peg may be varied and it is not essential that it is cylindrical in shape or have two arms as shown. Materials other than plastic may also be used provided they create a zone to allow for relative expansion of the components during operation. The plastic sleeve may cover the whole of the peg if preferred.

The location of the above structures is readily apparent in FIG. 1 where the outer casing 15 is lined by the insulating material 17 which in turn abuts the refractory cast material 18 to form an internal cavity 20 which defines the oven space.

The top section 11 may include a flue 21 for removal of hot gases. A door space 22 is provided in the top section and it is envisaged that all oven top sections will be formed with at least one access aperture. This view also shows insertion of a chargrill 23 which may be an optional addition to the oven. The present structure provides the ability to insert extra accessories into the oven as the cast refractory material is strongly supported thereby minimising the chance of weakening the structure through the addition of extra ports. The cavity is preferably defined by a mould used in the manufacturing process to be described below. The mould may suitably be formed to create the desired apertures and correspond with apertures or recesses created in the outer casing 15. A side profile 24 of the oven cavity is apparent. It is preferred to have a domed or curved cavity to avoid any sharp angles within the oven cavity. Such sharp angles may be points of weakness. One of the advantages of the present invention is the ability to form a convex area 25 in the centre area of the cavity to thereby lower the oven lining into closer proximity with food to be cooked. This structure may enhance the cooking process and retain is structural integrity.

The top section 11 is supported on the base 12 which in turn is lined with refractory bricks 28 to provide a stone hearth. The door hearth may be formed by other suitable means which may include stainless sheeting marble, granite or other suitable material. The refractory bricks are continuous with a door hearth 26. A window 27 is also provided in the present oven which is another option effectively provided by the present structure. A strengthening gusset 29 is also visible.

Ovens produced by the present method may be of virtually any shape and made so that they can be shipped and transported to their final locations in small modular sections. A non-restricting example of the size of an oven are dimensions such as the height of the oven floor or hearth being 1100 mm (but is quite variable depending on the needs of an end user and location of the device).

The oven cavity may have a height of approximately 526 mm (outside dimension) which gives a good inside cavity height to cook items on the oven hearth.

The roof of the oven stores significant amounts of heat which is radiated to the floor hearth and gives the oven much of its cooking power. The oven door openings are usually made to a standard size to accept a standard plug door which is supplied with the ovens.

The present invention allows the size and shape of a door to be varied according to the needs of an end user.

Because of the manufacturing method and innate strength of the design, it is possible to incorporate added features or optional extras to the oven such as viewing windows, chargrills, internal lights, after market fire retardant systems, extra doors and gas fired systems. It is preferred to have a wall thickness in an oven of approximately 100 mm and a preferred minimum roof thickness of 100 mm. The internal roof design on round ovens is as noted able to include a convex shape to increase the cooking efficiency of the oven for a more effective radiated heat pattern. The present invention allows the ovens to be made in sections to permit transport through standard door opening and lifts in multi-storey buildings. The present invention may extend to the top section being divided into two or more subsections for subsequent reassembly in operation. The retaining strength will then be provided by mechanisms applied to the steel outer casing which avoids the problem of structural integrity relying on side to side abutment as provided in prior art sectional domes.

The top section, the base including the stone hearth, and the support frame may be formed separately, packed and transported to the end location.

The method of production may commence with finalisation of a design and drafting of appropriate plans. A steel shell of 5 or 6 mm thickness may then be fabricated for the outer casing section. A matching base section is formed at the same time. The base may also be formed from 5 or 6 mm mild steel supporting legs (which may be 75 or 100 mm shs galvanised legs) included in the base or formed as part of a separate support frame. In cases where the oven is large or specific installation difficulties arise, the top and base sections may be formed in broken sections to avoid the problems arising from installation.

The steel work is cut, rolled and welded to standard steel sheetmetal fabricating practices. Welding is preferably preformed by MIG (metal induced gas) and includes Butt and Fillet welding techniques. The fabricated sections are preferably braced and gusseted as required by the design to ensure rigidity. The gussets to the top oven section may have holes positioned to make lifting and assembly easier. The tops of the ovens may be formed with an appropriately sized aperture in the roof to allow for castable material to be inserted during the process of manufacture.

A steel fabricator may also weld stainless steel anchor pins to the inside of the top section of the oven. The anchor pins may suitably be approximately 6 mm in diameter. The pins may vary in length according to their position and the final depth of the castable material in that position. Once the anchors are welded into place they are capped with plastic covers as described above. It is then necessary for the refractory inner lining to be applied to the oven top and base sections.

To complete the top section of the oven, the steel shell is lined with an insulating material such as 25 mm thick insulating wall. An appropriate material is "Thermal Ceramics—Kao Wool 25 mm, 128 density". This and other Thermal Ceramic products which may be obtained from Thermal Ceramics at PO Box 923, Dept. 140, Agusta, Ga. 30903. An alternative source is Thermal Ceramics Australia Pty Ltd at 65 Bourke Street, Alexandria, NSW 2015. Other equivalent materials may be used if preferred. This "wool" is wetted down and the oven case is placed onto a casting platform. The outer shell is locked into position over a preformed cavity mould which defines the final shape and size of the oven cavity. With the shell locked to the casting plate, the refractory castable (which may suitably be "Thermal Ceramics—Moral 125") may be prepared to the manufacturer's specifications through careful mixing in a paddle type mixer and poured into the formed mould on the casting platform. The refractory mixture is preferably vibrated to help fill the mould and dispel air pockets. This process also adds to the setting process of the castable. Care is required at this stage to avoid problems in setting. The cast product may be left to set undisturbed for 24 hours and then another 24 hours is allowed before the mould can be removed from the oven cavity. At this stage, the castable is considered to be hydraulically (or Wet) bonded and is quite solid for final hand shaping (grinding or drilling) to final shape. The next progress for the refractory castable is to absorb heat which totally dries the castable material and then converts the material bonding from hydraulic to a ceramic bonded material. This process may suitably be performed at the commissioning stage of the oven after it is fully assembled on site at a customer's premises. The procedure may suitably comprise slow heating of the oven for 48 hours to 180 degrees centigrade and then raising the temperature to 400° C. for a further 24 hours.

The base section of the oven may be completed by covering the flat mild steel support with 25 mm vacuum formed insulating board. The base is then inlaid with 75 mm thick refractory bricks (a suitable material is "Thermal Ceramics—Moral 70"). These bricks may suitably be laid in a herringbone pattern to the door area which has the bricks cut to a taper to fit in an arched keystone pattern in the case of a round oven or square cut in the case of rectangular oven. The floor bricks are set in position and mortared together which may be performed using "Thermal Ceramics—Moral Bond 35" or other suitable material. For the sake of transporting and insulation of the oven assembly, the bricked oven floor may be secured to the oven base with ply wood and timber framed covers.

The oven components may be packaged, usually on to pallets, and shipped or transported to a customer's designated site. The oven then is assembled in a location where it is to be used or where it can be moved as an assembly to the position of use. The assembly process involves using suitable heavy lifting apparatus to place the oven top section onto the base section. As this assembly is done, a ceramic wall gasket (for example, "Thermal Ceramic—Kao Wool 13 mm, 128 density") is placed around the perimeter of the base to seal the section. A final layer of exterior 50 mm insulation (for example, "Thermal Ceramics—Super Wool 607") may be located around the external surface of the oven to further insulate the device. This insulation may be glued (using for example, "Thermal Ceramics—KAO-Grip") and some mortar may be used to seal the top section to the bottom section internally where the gasket is fitted.

To this basic oven, services such as an exhaust system and gas system may be arranged if required. Further oven options may be attached as desired and commissioning can then proceed as explained.

The present oven is designed to be preferably heated by either a timber fire or a gas fire. Electric heaters may also be used. The large mass of the oven cavity walls, roof and floor (often between 1–4 tons) are capable of storing large amounts of heat energy. The oven may take up to 2 days to heat from cold and will cook for days once hot. Once heated, only small amounts of heat energy are required to be used at intervals during the day.

Figure 2:
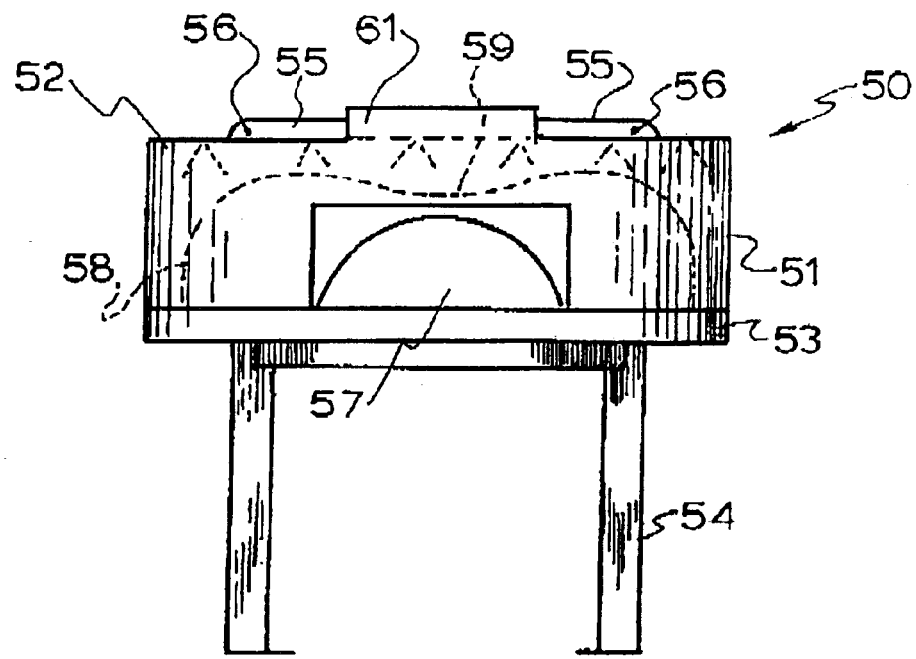
FIG. 2 is a front view of a second embodiment of an oven of the present invention.
Figure 3:
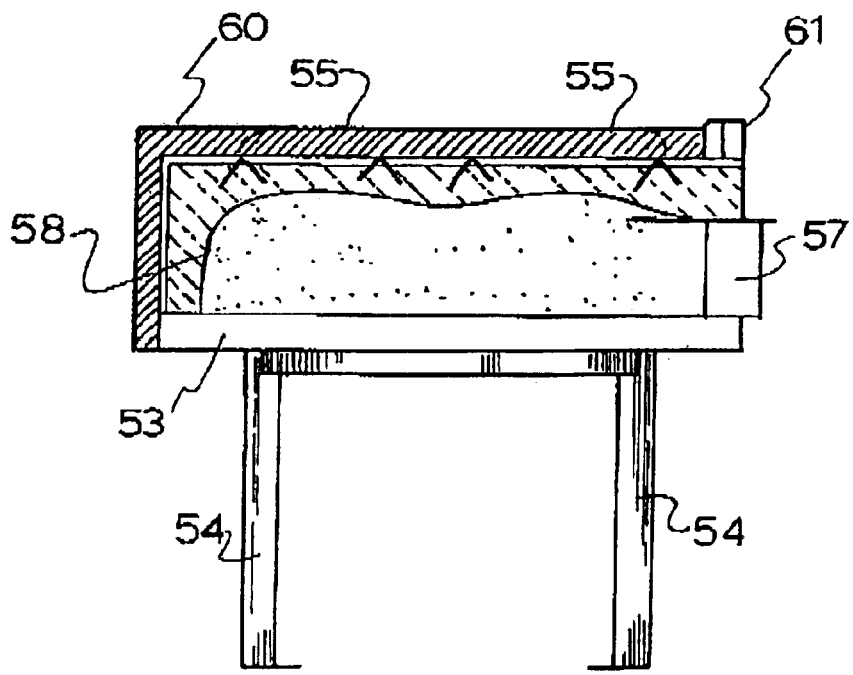
FIG. 3 is a side view of the oven of FIG. 2.

Referring to FIG. 2 there is seen a front view of an oven 50 of the present invention have substantially cylindrical side walls 51 of the top section 52 supported on a base 53 and support frame with legs 54. The top section 52 has strengthening ribs 55 with apertures 56 to facilitate attachment of lifting ropes or chains. The top section 52 has a door 57 for positioning of fuel and food to be cooked. A profile 58 of the oven cavity is shown in hidden detail with the convex area 59 readily apparent. FIG. 3 shows a side sectional view of the same embodiment as FIG. 2 but includes an external layer of insulation 60. A flue spigot 61 is also provided.

Figure 4:
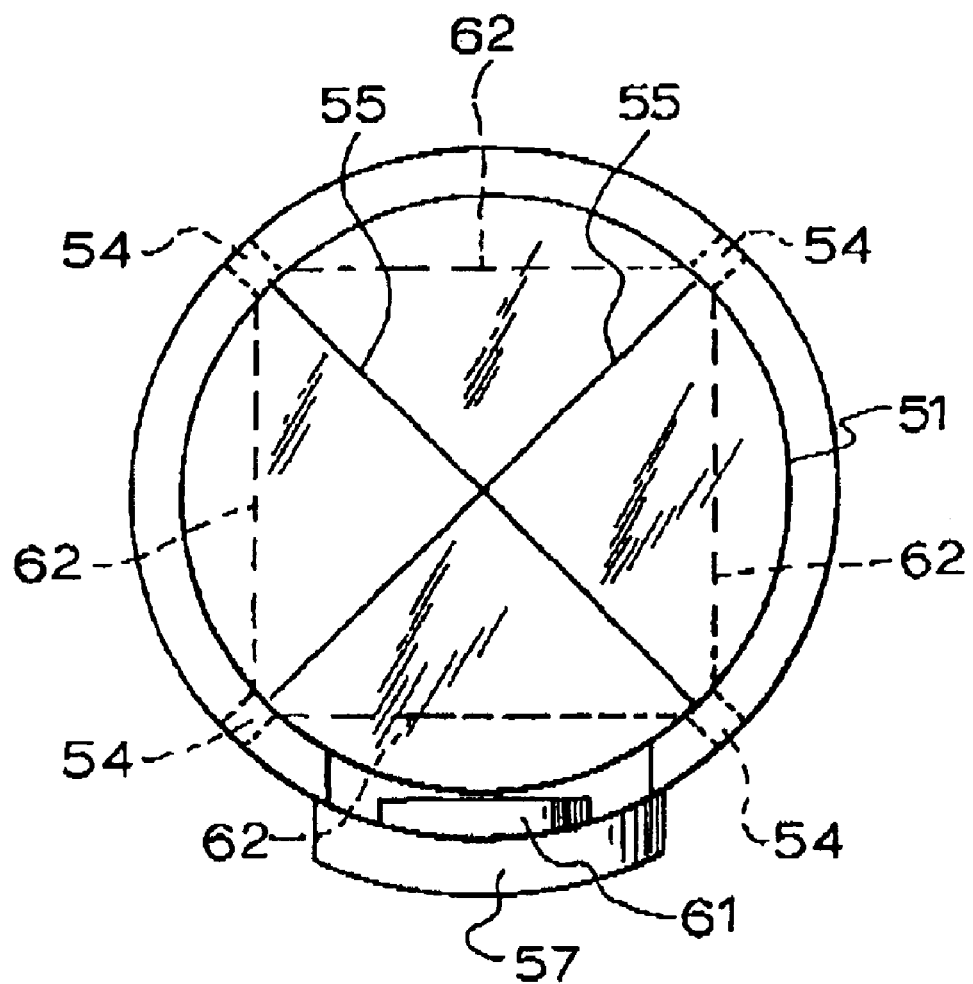
FIG. 4 is a top view of the oven of FIG. 2.

FIG. 4 shows a top view of the embodiment of FIGS. 2 and 3 which highlights the circular nature of the side walls 51 and the distribution of the legs 54 and flue spigot 61 is apparent as is the extension of the door hearth at the door 57. A lintel around the door is shown welded to the outer shell to facilitate building-in processes at installation. The lintel may be formed as an arched passageway extending from the doorway. Ribs 55 are positioned at right angles to each other.

Also apparent are cross braces 62 (in hidden detail) fixed to the legs to provide extra stability.

The oven may be placed into final position and then an external structure erected around it which may be formed from bricks or plasterboard or any suitable material to provide an aesthetically pleasing finish to the installation, although this is not essential for oven operation.

Throughout the specification the aim has been to describe the preferred embodiments of the invention without limiting the invention to any one embodiment or specific collection of features. Those of skill in the art will therefore appreciate that, in light of the instant disclosure, various modifications and changes can be made in the particular embodiments exemplified without departing from the scope of the present invention. All such modifications and changes are intended to be included within the scope of the appendant claims.

What is claimed is:

1. A top section for an oven, the top section comprising:
   an outer support shell,
   an inner refractory lining,
   an insulating layer intermediate the outer support shell and inner refractory lining and
   connection means for connecting the outer support shell, inner refractory lining and intermediate insulating layer wherein the connection means comprise a plurality of spaced members fixed to the outer support shell, extending across the intermediate insulating layer and fixed to the inner refractory lining.

2. The top section of claim 1 wherein the spaced members are formed as pins.

3. The top section of claim 2 wherein the pins are stainless steel pegs.

4. The top section of claim 3 wherein at least some of the stainless steel pegs have an angled portion.

5. The top section of claim 2 wherein the pins are welded to the outer support shell.

6. The top section of claim 2 wherein the pins are fixed to the inner refractory lining as a result of the inner refractory lining being cast around a portion of the pins distal to the outer shell and being allowed to set.

7. The top section of claim 2 wherein the pins include a coating or cover applied to at least part of the outer surface of each pin including a distal region of the pin, wherein the coating or cover is adapted to provide an expansion space between the pin and the refractory lining to permit expansion of the pin relative to the refractory lining.

8. The top section of claim 7 wherein the coating or cover is formed from a plastics material.

9. The top section of claim 8 wherein the plastics material is a thermoplastic material.

10. The top section of claim 1 wherein the outer support shell is formed from steel.

11. The top section of claim 10 wherein the steel is 5 to 6 mm thick.

12. The top section of claim 1 wherein the outer support shell is substantially cylindrical.

13. The top section of claim 1 wherein the outer support shell is configured substantially as a box.

14. The top section of claim 1 wherein the inner lining is a refractory castable material.

15. The top section of claim 14 wherein the refractory castable material is a ceramic material.

16. The top section of claim 1 wherein the intermediate insulating layer comprises a fibrous insulating material.

17. The top section of claim 16 wherein the fibrous material is formed as a blanket.

18. The top section of claim 17 wherein the top section is formed from two or more subsections.

19. An oven comprising:
a top section comprising:
an outer support shell,
an inner refractory lining,
an insulating layer intermediate the outer support shell and inner refractory lining, and connectors for interconnecting the outer support shell, inner refractory lining and intermediate insulating layer wherein the connectors comprise a plurality of spaced members fixed to the outer support shelf, extending across the intermediate insulating layer and fixed to the inner refractory lining and a base engaged with the top section so as to together define an interior oven space.

20. The oven of claim 19 wherein the base comprises a metal support layer and a refractory layer abutting the metal support layer.

21. The oven of claim 20 wherein the refractory layer is formed of bricks.

22. The oven of claim 19 including at least one of an oven door, a viewing window, a char-grille, an internal light, a fire retardant system, one or more extra doors and a gas fire system.

23. The oven of claim 19 further comprising a support stand.

24. The oven of claim 19 further comprising a flue.

25. The oven of claim 19 further comprising an outer insulating layer positioned adjacent an outer surface of the outer support shell.

26. The oven of claim 19 further comprising a lintel extending from a door aperture.

27. A method of forming an oven top section, said method comprising the steps of:
forming an outer support shell;
fixing a plurality of inwardly directed pegs to the outer support shell;
locating an insulating material inside the outer support shell such that the pegs extend through the insulating material;
positioning a mould, the mould defining the shape of a cavity of the oven inside the outer support shell; and
casting a refractory material to form an inner lining of the oven top section, the refractory material positioned to set around a distal portion of the pegs.

28. The method of claim 27 wherein the outer support shell is formed with apertures for a door and a flue.

29. The method of claim 27, further including the step of forming additional apertures for at least one of one or more extra doors, internal lights, a char-grille, a fire retardant system and a gas fired system.

30. The method of claim 27 further including the step of fixing the pegs to the outer shell by welding.

31. The method of claim 27 further including the step of locating a plastic layer or cover on a distal region of each of the pegs.

32. The method of claim 27 further including allowing the cast refractory material to set so as to form a base of the oven and fix the top section to the base.

33. The method of claim 27 further including the step of splitting the top section into two or more subsections each comprising an outer shell, an intermediate insulating layer and inner lining, transporting the subsections to an installation site and reforming the top section.

* * * * *

UNITED STATES PATENT AND TRADEMARK OFFICE
CERTIFICATE OF CORRECTION

PATENT NO. : 6,951,214 B2
DATED : October 4, 2005
INVENTOR(S) : Robert Bradley Beech It is certified that error appears in the above-identified patent and that said Letters Patent is hereby corrected as shown below:

<u>Title page,</u>
Item [57], ABSTRACT,
Line 20, delete "mold" and insert -- mould --.

<u>Column 2,</u>
Line 36, delete ""Moldit D" $^{tm}$"" and insert -- "Moldit D $^{tm}$" --.

<u>Column 9,</u>
Line 20, after "the outer support" delete "shelf" and insert -- shell --.

Signed and Sealed this

Second Day of May, 2006

JON W. DUDAS
*Director of the United States Patent and Trademark Office*